Jan. 30, 1934.    R. SCHISKE    1,945,203

LIQUID LEVEL GAUGE

Original Filed Feb. 13, 1930

Inventor
Rudolf Schiske
By Singer, Atty.

UNITED STATES PATENT OFFICE 1,945,203

LIQUID LEVEL GAUGE

Rudolf Schiske, Vienna, Austria

Application February 13, 1930, Serial No. 428,220, and in Austria February 24, 1929. Renewed April 18, 1933.

2 Claims. (Cl. 73—54)

This invention is an improved liquid level gauge for ascertaining the liquid contents of a closed container or vessel. According to this invention a pressure is generated in a separate chamber connected to the main vessel or container and the volume of free space in the main chamber is then varied to effect an equalization of the pressure in the two spaces. This variation of volume then is an indication of the size of the free space.

For this purpose it is necessary according to the invention to put one side of a differential pressure gauge in communication with a device for producing the auxiliary pressure, and the other side in communication with the free air space of the main vessel, and a chamber contiguous thereto, which is provided for the purpose of enabling the pressure equalization to be effected, which latter vessel is associated with a device indicating the volumetric change.

Figure 1:
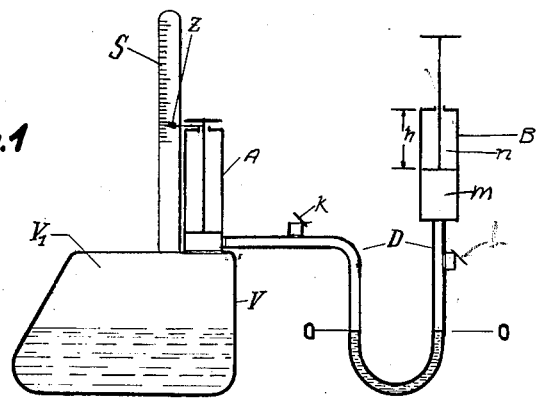
Figure 2:
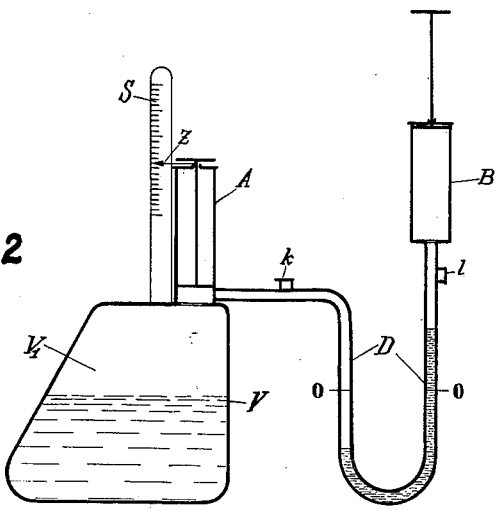
Figure 3:
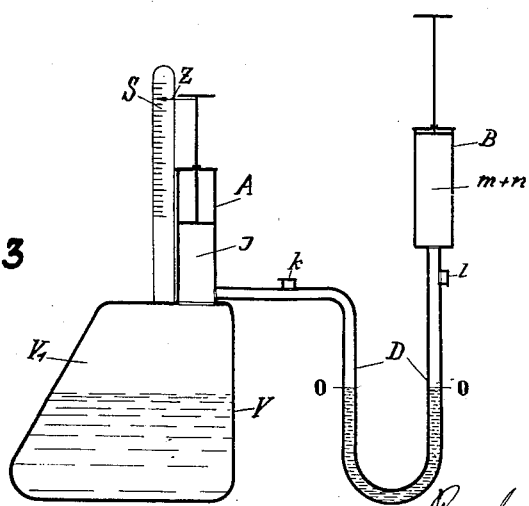

The accompanying drawing illustrates diagrammatically a constructional example of the means employed in carrying out this invention, in which Figures 1 to 3 are diagrams showing the arrangement with the measuring apparatus in three different positions assumed when ascertaining the contents of the vessel. V denotes the main chamber the liquid contents of which are to be measured. V' indicates the volume of the free space above the liquid. A is the auxiliary vessel in connection with the principal vessel, J denotes the volume displaced by the piston of the vessel A when raised during the pressure equalization, B is the device arranged for the generation of the necessary auxiliary pressure, and which is here shown as a vessel having a piston therein, $h$ is the uniform and constant height of stroke of the piston of this pump, and D is a U-shaped liquid gauge the opposite sides or legs of which are connected with the device B and the liquid containing vessel V. S denotes the scale which is arranged along the auxiliary vessel A. Z denotes the indicator on the piston rod of A. $k$ and $l$ are the relief valves for both sides of the liquid manometer, and which may be of any suitable form.

Normally as in Figure 1, the piston of A is in the lowest position and the piston of B is in a predetermined position which may be rendered positive by a mark on the rod thereof, as will be understood, the relief valves $l$, $k$ are open and the level of the liquid in D is therefore at O—O. Any suitable means, such for instance as springs in the hinges of the valves may in practice be employed to open the valves and normally hold them in open position as shown in Fig. 1. Said valves are eventually necessarily manually closed.

When the device is in use, there is first of all, after the valves $k$, $l$ have been closed, a certain amount of vacuum created in B by drawing the piston up to the extent $h$. The reduced pressure thus effected is indicated in the pressure gauge (Figure 2), then the piston of vessel A is lifted until the indicator of the pressure gauge again assumes the position O—O, that is to say, the pressure equalization has taken place (Figure 3). Now it is possible to read the amount of free space V in the liquid container off at that division of the scale S at which the indicator hand Z has remained stationary, the said scale S being calibrated in units of volume of liquid in the container V. The difference between the total content of the vessel or container and the number read off then indicates the amount of liquid.

If excess pressure is employed in the process, then it is necessary to depress the pistons of B and A from their initial positions.

Further, if the original or initial pressure in the free space of the vessel, and also that in the auxiliary vessel A before the pressure equalization is effected, is denoted by $p_0$, which pressure will in most cases be the atmospheric pressure, and if the auxiliary pressure is designated by $p_1$, which is in the example herein described as the reduced pressure, then: $V_1 \, p_0 = (J+V_1) \, p_1$. As the ratio of $p_1$ to $p_0$ is constant, that is to say $p_1 = p_0 c$, then the following results, that is:

$$V_1 p_0 = (J+V_1) c p_0 \text{ or } V_1 = \frac{cJ}{1-c}.$$

The value of $c$ can be ascertained if a cylindrical member B is used for producing the auxiliary pressure, the volume of the initial space of which in front of the piston is $m$ and the volume of the stroke is $n$. Then $m p_0 = (m+n) p_1$ and when $$p_1 = c p_0 \text{ then } c = \frac{m}{m+n}.$$

This is then interpolated into the formula for $V_1$ and it becomes $$V = \frac{J\left(\dfrac{m}{m+n}\right)}{1-\dfrac{m}{m+n}} = J \cdot \frac{m}{n}.$$

The same result is obtained when an excess pressure or super pressure is used.

The free space in the liquid container V is proportionally equal to J, as the cross section of the auxiliary vessel A is always the same and is a known quantity, proportional to the height of the lift of the piston in A, for that particular moment.

Having thus described my invention, I claim:

1. Apparatus of the class described, comprising a closed liquid containing vessel, an auxiliary vessel connected to the air space of the closed vessel and having means for varying the capacity of said auxiliary vessel, said means including a movable element having a pointer, a scale calibrated in units of volume of liquid in said container and with which said pointer cooperates, a duct having an upright U-bend therein, said duct having one end communicating with said auxiliary vessel adjacent the point of connection with the air space of the closed vessel, a second auxiliary vessel to which the other end of said duct is connected, a liquid in the U-bend of said duct, said duct having a valve disposed therein between the auxiliary vessel and the liquid in the U-bend and also having a valve between said liquid and the second auxiliary vessel, said valves opening to the atmosphere, said second auxiliary vessel also having means to vary the capacity thereof.

2. Apparatus as claimed in claim 1, in which the duct is a liquid gauge, the opposite sides of which are connected respectively to the auxiliary vessels.

RUDOLF SCHISKE.